US005348780A

United States Patent [19]

Boggs et al.

[11] Patent Number: 5,348,780

[45] Date of Patent: Sep. 20, 1994

[54] MULTIPURPOSE LABEL CONSTRUCTION

[75] Inventors: Steven W. Boggs, Florence, S.C.; Richard L. Moor, Angola, Ind.

[73] Assignee: Moore Business Forms, Inc., Grand Island, N.Y.

[21] Appl. No.: 936,049

[22] Filed: Aug. 28, 1992

[51] Int. Cl.[5] .......... B32B 3/10

[52] U.S. Cl. .......... 428/42; 281/2; 281/5; 283/81; 283/101; 283/105; 283/107; 283/108; 428/43; 428/174; 428/187; 428/195; 428/213; 428/220; 428/481; 428/537.5

[58] Field of Search .......... 428/40, 41, 42, 43, 428/481, 220, 195, 57, 537.5, 187, 174, 213; 283/81, 101, 105, 107, 108; 281/2, 5

[56] References Cited

U.S. PATENT DOCUMENTS

| | | | |
|---|---|---|---|
| 2,825,159 | 3/1958 | Schor | 283/81 |
| 3,329,550 | 7/1967 | Kucheck | 156/285 |
| 3,854,229 | 12/1974 | Morgan | 283/81 |
| 4,046,613 | 9/1977 | Kucheck et al. | 156/249 |
| 4,475,978 | 10/1984 | Bartl | 156/497 |
| 4,479,839 | 10/1984 | Tasma | 156/249 |
| 4,612,076 | 9/1986 | Moss | 156/249 |
| 4,627,994 | 12/1986 | Welsch | 428/41 |
| 4,692,199 | 9/1987 | Kozlowski et al. | 156/245 |
| 4,707,208 | 11/1987 | Crumbach et al. | 156/285 |
| 4,784,714 | 11/1988 | Shibata | 156/354 |
| 4,865,669 | 9/1989 | Schmidt | 156/91 |
| 4,951,970 | 8/1990 | Burt | 283/67 |
| 4,983,438 | 1/1991 | Jameson | 428/42 |
| 5,129,682 | 7/1992 | Ashby | 283/81 |
| 5,135,789 | 8/1992 | Schmidt | 428/42 |
| 5,147,699 | 9/1992 | Browning et al. | 428/40 |

FOREIGN PATENT DOCUMENTS 488813 6/1992 European Pat. Off. .

*Primary Examiner*—Ellis P. Robinson
*Assistant Examiner*—Nasser Ahmad
*Attorney, Agent, or Firm*—Nixon & Vanderhye

[57] ABSTRACT

A composite label assembly includes a release sheet having first and second sides, with a first cellulose paper label attached by repositional adhesive on the first side, and a second polyester label with permanent pressure sensitive adhesive on the second side. The first label has first indicia relating to an appliance, such as a water heater, while the second label has second indicia relating to the same appliance, e.g. model number and/or serial number. The assembly also includes a shipping label and a warning label. The composite label assembly is easily and readily produced from a web of paper label stock associated with a web of release paper by die cutting paper labels from the label stock and removing the matrix material, and then affixing on the polyester labels directly to the release web.

11 Claims, 3 Drawing Sheets

MULTIPURPOSE LABEL CONSTRUCTION

BACKGROUND AND SUMMARY OF THE INVENTION

In a number of situations, it is desirable to manufacture composite label assemblies that have a multitude of functions. For example one known commercially utilized combination label assembly utilizes 50 pound electronic data processing paper ("50 EDP") with permanent pressure sensitive adhesive, and 50 EDP with repositional pressure sensitive adhesive, for four different functions, namely as a shipping carton label, an agency rating plate label, an energy guide label for the appliance rated, and a warning label. This allows all of the labels associated with a particular appliance to be marketed, such as a water heater, to be manufactured at the same time so that the appliance may be properly labelled and shipped efficiently and effectively. While this concept is very practical, there have been complications associated with ultimate use of the labels associated with the composite assembly. In particular, it has been necessary to apply a clear polyester tape over the agency rating plate label (containing the serial number and model number) in order to obtain agency approval for durability of the label.

In an effort to eliminate the relatively labor intensive and expensive step of applying a separate clear polyester tape over the agency rating plate label when applied to a water heater or like appliance, attempts have been made to tip-on a polyester label with release sheet onto the web containing the rest of the labels. However this construction was of non-uniform thickness, and at the polyester label the thickness was great enough so that it would not pass through some impact printers without binding.

According to the present invention, a composite label assembly is provided that eliminates the problems associated with the prior art constructions discussed above. In particular, the construction according to the present invention has substantially uniform thickness so that it will pass through substantially all types of impact printers for printing variable data thereon, and utilizes a polyester label so that the agency rating label can be applied directly to the water heater or other appliance without the necessity of a clear polyester tape covering therefor. Also, the composite according to the invention is advantageous because the 50 EDP paper for the energy guide label (and warning label where provided) is replaced with a 60 pound OCR paper, with repositional adhesive.

According to one aspect of the present invention, a composite label assembly is provided comprising the following elements: A release sheet base having a vertical mid line dividing the base into first and second sides. A first paper label, with pressure sensitive adhesive, disposed on the first side of the base, and having first indicia printed thereon relating to an appliance. And, a second label, with pressure sensitive adhesive, disposed on the second side of the base, the pressure sensitive adhesive directly securing the second label to the base, and second indicia, relating to the appliance, printed on the second label; the second label constructed of a material capable of withstanding high temperature conditions substantially better than cellulose paper, so that when applied to the appliance the second indicia thereon will remain readable for years.

The second label typically is of plastic, preferably polyester. A third label having pressure sensitive adhesive is disposed on the second side of the base having third indicia, comprising shipping indicia, printed on it, and a fourth label is typically provided on the first side. The pressure sensitive adhesive of the first label, which is typically cellulose paper, such as 60 pound OCR paper, is repositional adhesive, while the pressure sensitive adhesive of the second label is permanent adhesive. The second indicia typically includes a serial number for a water heater, a model number, and like indicia. The entire construction has a substantially uniform thickness and is particularly useful for energy guide, shipping, agency approval, and warning labels associated with a hot water heater or the like.

According to another aspect of the present invention a method of producing a composite label assembly, using a web of paper label stock attached by pressure sensitive adhesive to a first surface of a web of release paper, to provide a composite web, is provided. The method comprises the steps of: (a) Printing the paper label stock of the composite web. (b) Die cutting labels from the label stock of the composite web. Then (c) removing remaining matrix material from the die cut labels of the composite web. (d) Printing plastic labels having pressure sensitive adhesive; and (preferably after steps (c) and (d)) (e) affixing the plastic labels with pressure sensitive adhesive onto exposed portions of the first surface of the web of release paper, to provide a final web having a plurality of paper labels for each plastic label, in a regular array. There is also preferably the further step (f), after step (e), of simultaneously printing variable data on the plastic labels and the paper label stock of the final web. There may also be the further step of forming the web of release paper of two separate webs, one web ultimately containing the plastic labels, and the other web containing the cellulose paper label stock, and step (a) may be practiced by printing cellulose paper label stock having repositional pressure sensitive adhesive adhering the stock to the release paper web. Step (e) is typically practiced at a speed of approximately 250 feet per minute (or about one thousand label applications per minute).

According to still another aspect of the present invention, there is provided a composite label assembly comprising a release sheet base having a vertical mid line dividing the base into first and second sides, a first cellulose paper label with pressure sensitive adhesive disposed on the first side of the base and having first indicia printed thereon relating to an appliance, and a second, plastic, label with pressure sensitive adhesive securing the second label directly to the base on the second side of the base, and having second indicia relating to the appliance printed on the second label. The label is produced by: (a) Printing first indicia on cellulose paper label stock. (b) Die cutting labels from the cellulose paper label stock. Then (c) removing remaining matrix material from the die cut labels. (d) Printing the second indicia on the plastic labels. And then after steps (c) and (d) (e) affixing the plastic labels with pressure sensitive adhesive onto exposed portions of the release sheet base.

It is the primary object of the present invention to provide a simplified and enhanced composite label assembly. This and other objects of the invention will become clear from an inspection of the detailed description of the invention, and from the appended claims.

DETAILED DESCRIPTION OF THE DRAWINGS

Figure 1:
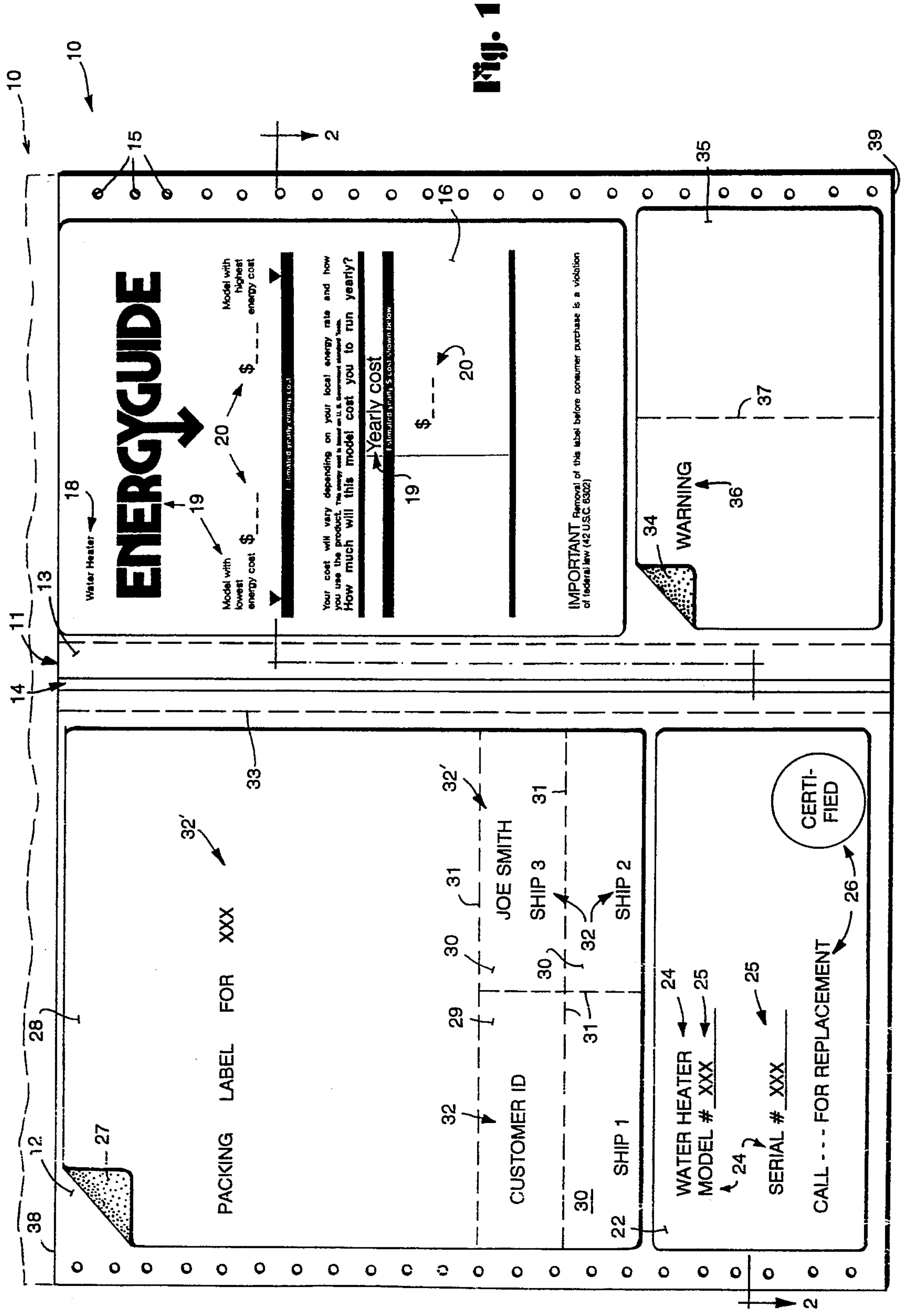
FIG. 1 is a top plan view of an exemplary composite label assembly according to the present invention.
Figure 2:
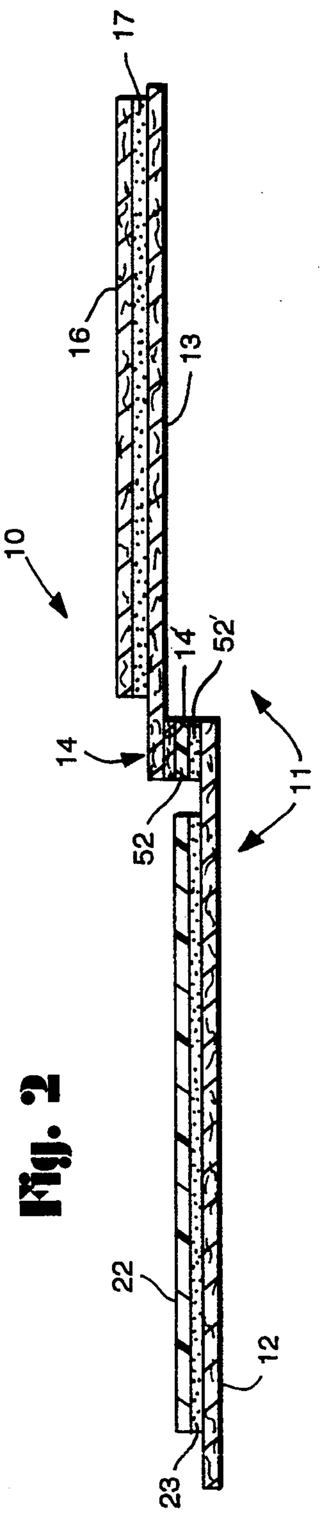
FIG. 2 is a cross-sectional view of the label assembly of FIG. 1 taken along lines 2—2 of FIG. 1.

A composite label assembly according to the present invention is shown generally by reference numeral 10 in FIG. 1. The first component of the assembly 10 comprises a release sheet 11, which is constructed from a first portion 12 and a second portion 13 which overlap at a seam 14 (see FIGS. 1 and 2). The overlapping portions of seam 14 are held together by permanent adhesive 14' or the like (see FIG. 2). The seam 14 defines a vertical mid line (which may be an exact center line, or otherwise positioned depending upon the relative dimensions of the labels to be associated with the release sheet portions 12, 13), defining first and second sides of the top surface of the release sheet base 11. While a wide variety of materials could be utilized, the release sheet base portions 12, 13 are preferably formed of 50 pound electronic data processing (50 EDP) paper, of course coated so as to provide a release function. Preferably tractor drive holes 15 (see FIG. 1) are provided along both edges of the base 11 to facilitate feeding during construction of the label assembly 10, and during printing.

The assembly 10 further comprises a first paper (preferably cellulose paper) label 16 disposed on the first side (i.e. on portion 13) of the release sheet base 11 mid line at seam 14. Preferably, according to the invention the paper 16 is 60 pound OCR paper. Pressure sensitive adhesive 17 (see FIGS. 2 and 3) is associated therewith and releasably attaches the label 16 to the release liner portion 13. Preferably the pressure sensitive adhesive 17 is repositional adhesive, such as sold by Moore Business Forms, Inc. of Lake Forest, Ill. under the trademark "CLEANTAC", or the repositional adhesive utilized in the commercially available Moore "NOTE STIX" products.

The label 16 has first indicia printed thereon. The first indicia includes the indicia 18, 19 as illustrated in FIG. 1. The indicia 18 indicates that the label 16 is associated with an appliance—in this case a water heater—while the indicia 19 provides other indicia indicating information about the appliance indicated by indicia 18, in this case energy guide information such as yearly cost, and models with the highest and lowest energy cost. Indicia 20 also is provided comprising variable indicia that is printed on for a particular water heater to which the label 18 is to be applied.

The assembly 10 also comprises a second label 22 with pressure sensitive adhesive 23 (see FIG. 2) disposed on the second side portion 12 of the release sheet base 11. The pressure sensitive adhesive 23, which preferably is permanent adhesive, directly secures the second label 22 to the release sheet base 12 (see FIG. 2), so that the assembly 10 has substantially uniform thickness (except at the seam 14, which will not interfere with subsequent printer operation). The label 22 is of a material capable of withstanding high temperature conditions (such as those a label would be subjected to when applied to a water heater) substantially better than cellulose paper so that when it is applied to an appliance (such as a water heater) indicia printed thereon will remain readable for years. Preferably the material of the label 22 is a plastic, such as polyester.

The label 22 has non-variable indicia 24 printed thereon, such as the appliance for which it is to serve as an agency rating plate label (i.e. water heater in this case), model number, and serial number. Variable data 25 is also provided thereon as second indicia, the variable data 25 for example being the model number and/or serial number. Further, the second indicia may comprise additional non-variable or variable printing 26 having other information thereon, such a certificate symbol, or the like. A certification symbol (26) indicates that an appropriate governmental agency, or an association, has approved the appliance.

In order to provide a number of functions with the same assembly 10, it is also highly desirable that the assembly 10 include a third label 28 disposed in operative association with the release sheet portion 12, and connected directly thereto by permanent pressure sensitive adhesive 27 (see FIG. 1). The third label 28, which preferably is of 50 EDP, is primarily used as a shipping label, for example having one label 29 providing for certain functions, and other labels 30 providing shipping functions. Perforations, or other lines of weakness, 31 divide up the third label 28 into individual additional labels 29, 30, having non-variable indicia 32 printed thereon, and variable data 32' also may be printed thereon (e.g. shipping locations, etc.).

Preferably, the portion 12 is also separated from the portion 13 by a line of weakness, such as a perforation line 33, that is parallel to and adjacent the seam 14. This allows the various portions 12, 13 of the label assembly 10 to be detached if desired.

The assembly 10 also preferably comprises a fourth label 35, having repositional (or permanent) pressure sensitive adhesive 34 (see FIG. 1) attaching it to the release sheet portion 13, which label 35 functions as a warning label, for example having warning indicia 36 printed thereon. If desired the label 35 may be separable into different parts, as by provided by perforation line 37.

The assembly 10 also includes longitudinal "top" and "bottom" edges 38, 39, respectively (see FIG. 1). Preferably these edges 38, 39 are formed by perforation lines and the assembly 10 can be part of a continuous, regular array of assemblies, as indicated by the dotted line construction of a second assembly 10 at the top of FIG. 1.

Figure 3:
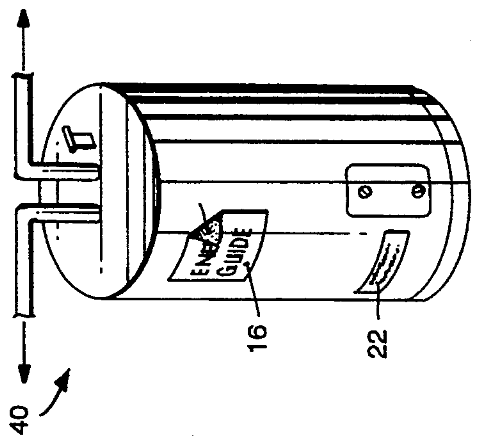
FIG. 3 is a perspective schematic view of a water heater having two of the labels from the assembly of FIGS. 1 and 2 applied thereto.

FIG. 3 illustrates how various components of the label assembly 10 are utilized. As seen in FIG. 3, a residential water heater 40 (gas or electric) has the first label 16 removably applied thereto (by the repositional adhesive 17), with the polyester label 22 permanently affixed thereto, and readable for many years. The label 22 is able to withstand for years the high temperatures associated with use on the water heater 40 while the indicia 24–26 thereon remains readable, without the necessity of applying a clear tape or the like thereover to protect it.

Figure 4:
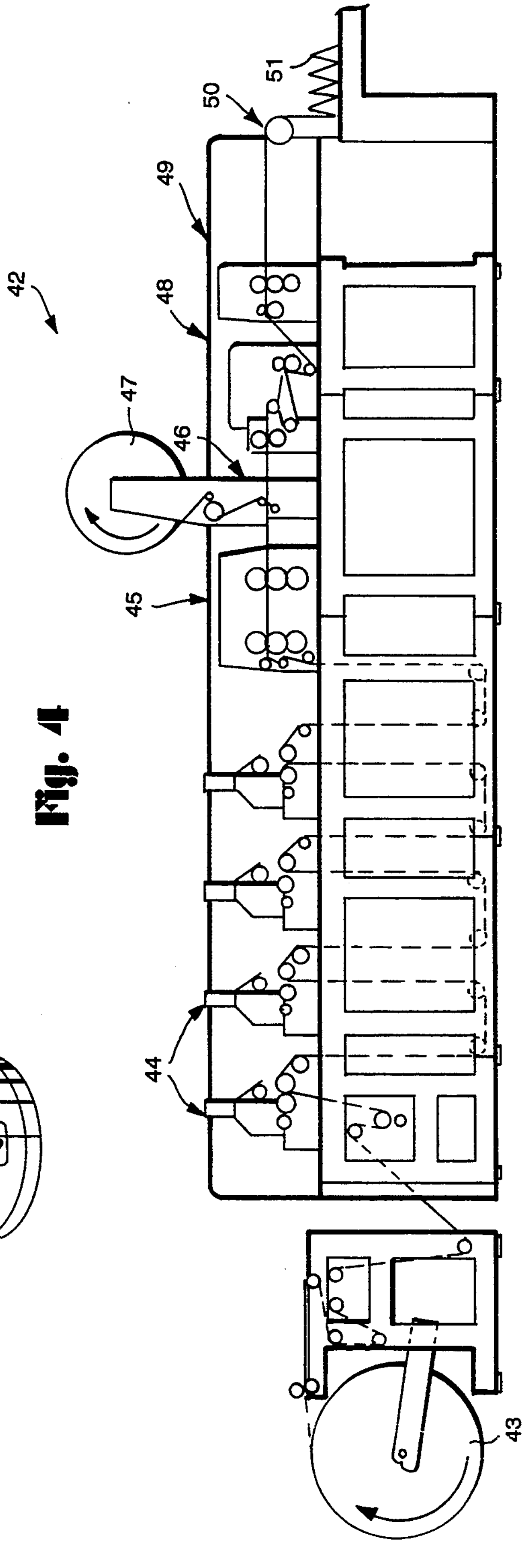
FIG. 4 is a schematic side view of exemplary conventional apparatus for producing the basic components (prior to the polyester label being affixed) of the assembly of FIGS. 1 and 2.

The label assembly 10 according to the present invention is preferably primarily constructed on a Webtron 1600 or like machine, as illustrated generally by reference numeral 42 in FIG. 4. A roll 43 of cellulose paper label stock attached by pressure sensitive adhesive to a first (top) surface of a web of release paper is provided in association with the machine 42. Preferably the label stock and web release paper provide a composite web roll 43 having the portions 12, 13, with 50 EDP cellulose paper over the portion 12 attached by permanent adhesive and 60 OCR paper attached to the portion 13 by repositional adhesive. The composite web is fed to one or more print stations 44 where non-variable indicia (e.g. 18, 19, 24, 32, 36) is printed on the label stock. The composite web is then fed to a die station 45 where the label stock is die cut into labels (i.e. labels 16, 28, and 35), and then passes onto conventional matrix material removing stations 46, 47, 48, where the matrix material is removed and rewound into a waste roll 47. The composite web, with matrix material removed, then passes to a sheeting station 49, and then to a collection assembly 50, where it is preferably fan folded as indicated at 51, the continuous assemblies 10 being folded about the lines 38, 39 thereof to form the fan fold construction 51 illustrated in FIG. 4.

It is noted that part of the matrix material removed from the composite web treated in FIG. 4 is the label stock over the part of the release paper portion 12 that will subsequently be covered by the label 22, so that the release paper portion 12 is exposed where the label 22 will ultimately be applied in the fan fold construction 51.

Since the release sheet portions 12, 13 are difficult to glue together, they are attached together at seam 14 by gluing a portion of the original paper label stock on the portion 12 to the back of portion 13. A remaining strip of the label face stock is indicated at 52 in FIG. 2, while a remaining strip of the adhesive holding it on portion 12 is illustrated at 52' in FIG. 2. The paper strip 52 is attached by the adhesive 14' to the back of release sheet portion 13.

Figure 5:
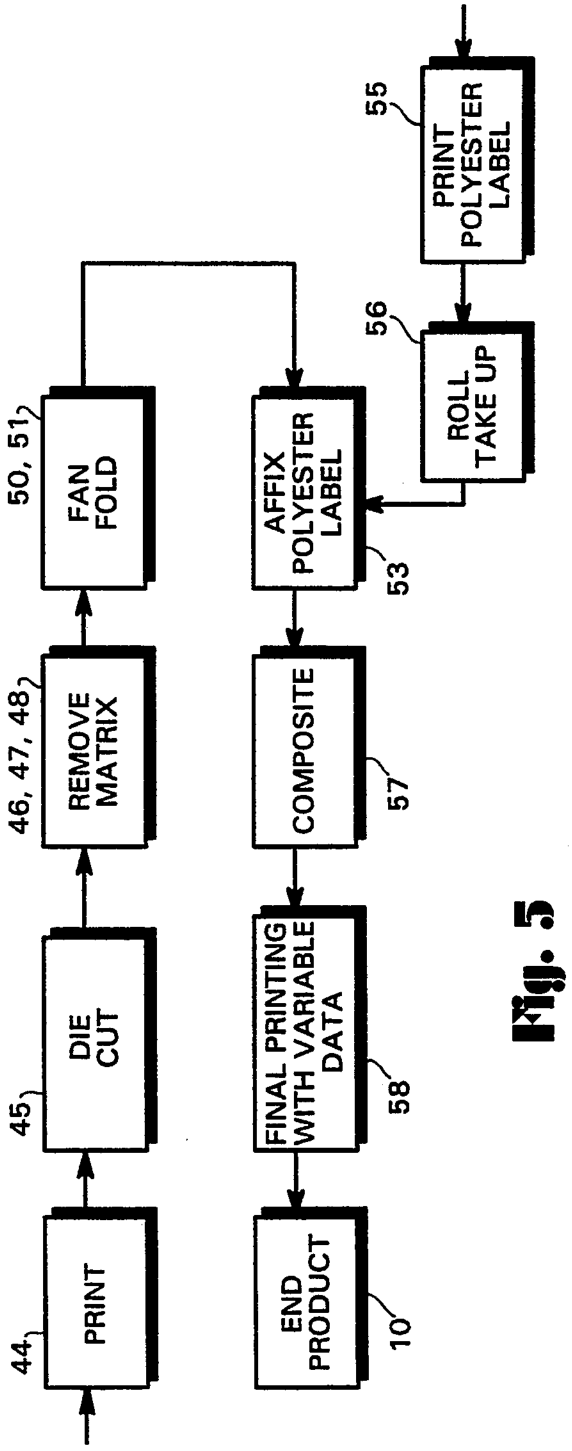
FIG. 5 is a flow chart illustrating practice of the various steps in the practice of the method according to the invention.

FIG. 5 schematically illustrates the steps performed by the apparatus 42 of FIG. 4, and additional steps utilized to construct the final label assembly 10. After fan folding at 50, 51, the forms are passed to a machine 53 which affixes the labels 22 on the web. The machine 53 preferably is a "Transform 1800" forms labelling system machine available from Quadrel Labelling Systems of Eastlake, Ohio, and capable of applying about one thousand labels per minute, or processing forms at about 250 feet per minute.

The labels supplied to the station 53 have non-variable data 24 and 26 printed thereon at station 55, and they are taken up on a roll at 56. The polyester labels are supplied to the equipment 53 in roll format, a composite product 57 being produced in which a polyester label 22 has been blown on to each release sheet base 11 of each assembly 10 of the continuous form assemblies.

Typically the product produced at 57 is provided to an end customer, such as the manufacturer of the appliances (e.g. water heaters 40) with which the assembly 10 will be utilized. That manufacturer then performs the final step of printing variable data 20, 25, and 32' etc on the assemblies, e.g. utilizing an impact printer which feeds the continuous forms of assemblies 10 therethrough using the tractor openings 15. The final end product 10 results.

Once the final end product 10 is provided, the individual labels thereof are removed and put on the appliance 40, or packaging therefor, for shipment to the ultimate consumer. For example the label 16 is removably applied to the water heater 40, while the label 22 is permanently applied to the water heater 40, and typically the various portions of the label 28 are provided on various shipping documents or packaging, and the warning label 35 is provided either on the packaging or the water heater 40 itself. The label 16 is easily and cleanly removed from the water heater 40 by the ultimate consumer, while the polyester label 22 remains permanently affixed thereto, and readable, for years.

It will thus be seen that according to the present invention an advantageous composite label assembly, and a method of manufacture thereof, have been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A composite label assembly of substantially uniform thickness comprising:

a release sheet base having parallel side edges and a mid line parallel to said side edges dividing the base into first and second sides;

a first paper label, with repositionable pressure sensitive adhesive, disposed on said first side of said base, and having first indicia printed thereon relating to an appliance; and a second polyester label, with pressure sensitive adhesive, disposed on said second side of said base, said pressure sensitive adhesive directly securing said second label to said base, and second indicia, relating to the appliance, printed on said second label; said second label is capable of withstanding high temperature conditions substantially better than cellulose paper, so that when applied to said appliance said second indicia thereon will remain readable for years.

2. A composite label assembly as recited in claim 1 further comprising a third label having pressure sensitive adhesive, spaced from said second label, disposed on said second side of said base; and third indicia, comprising shipping indicia, printed on said third label.

3. A label composite assembly as recited in claim 1 wherein said pressure sensitive adhesive associated with said second label is permanent adhesive.

4. A label composite assembly as recited in claim 1 wherein said second indicia includes a serial number for a water heater.

5. A label composite assembly as recited in claim 1 wherein the first paper label is cellulose paper.

6. A label composite assembly as recited in claim 2 wherein said release sheet is 50 pound electronic data processing paper.

7. A composite label assembly as recited in claim 1 wherein said first paper label is 60 pound optical character reader paper and wherein said pressure sensitive adhesive of said first label is repositional adhesive.

8. A composite label assembly as recited in claim 1 wherein said first indicia is energy guide indicia indicating the cost of operating a water heater, and wherein said second indicia includes the serial number and model number for the same water heater that the energy guide indicia corresponds to.

9. A composite label assembly as recited in claim 1 in continuous format with like composite label assemblies.

10. A label composite assembly as recited in claim 1 wherein said mid line comprises a seam formed by overlapping portions of release sheet base paper, and means defining a line of weakness adjacent and parallel to said seam.

11. A composite label assembly of substantially uniform thickness comprising a release sheet base having parallel side edges and a mid line parallel to said side edges dividing the base into first and second sides, a first cellulose paper label with repositionable pressure sensitive adhesive disposed on the first side of the base and having first indicia printed thereon relating to an appliance, and a second, plastic, label with pressure sensitive adhesive securing the second label directly to the base on the second side of the base, and having second indicia relating to the appliance printed on the second label, produced by the steps comprising:

(a) printing first indicia on cellulose paper label stock;

(b) die cutting labels from the cellulose paper label stock; then (c) removing remaining matrix material from the die cut labels;

(d) printing the second indicia on the polyester labels; and (e) affixing the polyester labels with pressure sensitive adhesive onto exposed portions of the release sheet base.

* * * * *